United States Patent [19]
Patel et al.

[11] Patent Number: 5,414,541
[45] Date of Patent: May 9, 1995

[54] OPTICAL SWITCH EMPLOYING FIRST AND SECOND FERROELECTRIC CELLS WITH ALIGNMENT LAYERS HAVING ALIGNMENT DIRECTIONS OFFSET BY 45°

[75] Inventors: Jayantilal S. Patel, Red Bank; Yaron Silberberg, West Windsor Township, Mercer County, both of N.J.

[73] Assignee: Bell Communications Research, Inc., Livingston, N.J.

[21] Appl. No.: 70,591

[22] Filed: Jun. 1, 1993

[51] Int. Cl.⁶ .................. G02F 1/13; G02F 1/137; G02F 1/1337; G02F 1/03
[52] U.S. Cl. .................................... 359/39; 359/42; 359/93; 359/256; 359/75
[58] Field of Search ............ 359/36, 93, 495, 301, 359/303, 42, 495, 250, 256, 247, 484, 283, 251, 243, 94, 39, 53, 75, 252

[56] References Cited

U.S. PATENT DOCUMENTS

| | | | |
|---|---|---|---|
| 3,499,700 | 3/1970 | Harris et al. | 359/303 |
| 4,367,924 | 1/1983 | Clark et al. | 350/334 |
| 4,410,238 | 10/1983 | Hanson | 359/93 |
| 4,461,543 | 7/1983 | McMahon | 359/42 |
| 4,948,229 | 8/1990 | Soref | 359/39 |
| 5,002,349 | 3/1991 | Cheung et al. | 350/96.13 |
| 5,111,321 | 5/1992 | Patel | 359/92 |
| 5,150,236 | 9/1992 | Patel | 359/71 |
| 5,172,257 | 12/1992 | Patel | 359/84 |
| 5,204,771 | 4/1993 | Koga | 359/495 |
| 5,212,587 | 5/1993 | Healey | 359/301 |

OTHER PUBLICATIONS

R. A. Soref, "Low-cross-talk 2×2 optical switch," *Optics Letters*, 1981, vol. 6, pp. 275–277.
R. A. Soref et al., "Calcite 2×2 optical bypass switch controlled by liquid–crystal cells," *Optics Letters*, 1982, vol. 7, pp. 186–188.
Y. Fujii, "Low-Crosstalk 1×2 Optical Switch Composed of Twisted Nematic Liquid Crystal Cells," *IEEE Photonics Technology Letters*, 1993, vol. 5, pp. 206–208.
R. E. Wagner et al., "Electrically controlled optical switch for multimode fiber applications," *Applied Optics*, 1980, vol. 19, pp. 2921–2925.

*Primary Examiner*—William L. Sikes
*Assistant Examiner*—Kenneth Parker
*Attorney, Agent, or Firm*—Leonard Charles Suchyta; James W. Falk

[57] ABSTRACT

A liquid-crystal optical beam switch comprising: a first birefringent layer (14) which divides an input beam (24) into its two polarization components; a first segmented twisted nematic liquid-crystal polarization modulator (16), the segments (30,32) of which rotate one of the polarization beams by 90° but not the other so they both have the same polarization state and which polarization state depends on the biasing state of a two-state biasing source (33); a second birefringent layer 18 which displaces the beams in a direction perpendicular to that produced by the first birefringent layer if they are of one polarization but do not displacement them if they are of the other polarization dependent upon the biasing state; a second segmented twisted nematic liquid-crystal polarization modulator (20) the segments (50,52) of which are oppositely biased from the segments of the first liquid-crystal modulator to thereby restore the original polarization difference; and a third birefringent layer (22) which, acting conversely to the first birefringent layer, recombines the beams into one of two output beams (58,64) dependent on the biasing state. A further stage of switching is provided by a fourth birefringent layer (104) having twice the thickness of and the same displacement direction as the second birefringent layer and by a separately switched associated unsegmented liquid-crystal polarization modulator (92).

4 Claims, 6 Drawing Sheets

OPTICAL SWITCH EMPLOYING FIRST AND SECOND FERROELECTRIC CELLS WITH ALIGNMENT LAYERS HAVING ALIGNMENT DIRECTIONS OFFSET BY 45°

FIELD OF THE INVENTION

The invention relates generally to liquid crystals. In particular, the invention relates to a liquid-crystal device capable of switching an optical signal between two or more channels.

BACKGROUND ART

The telecommunications network and other similar networks, such as intra-computer interconnects, are increasingly relying upon optical fibers for high-speed, noise-free data channels. However, optical networks generally suffer from their inability to switch an input signal between two or more output channels without the necessity of converting the optical signal to an electrical signal and using more conventional electronic switching. Various types of optical switching have been proposed, such as integrated optical devices (for example, directional couplers), SEED devices, non-linear optics, and acousto-optical converters. However, to date, all of these proposed solutions have required relatively advanced technology and thus have been considered uneconomical to implement in a practical network.

Of the optical switching devices so far proposed, most have severely suffered from their sensitivity to polarization. In one application, these optical switching devices are used at some intermediate point between the source and the destination of the optical path. However, the fiber causes the polarization state of the optical signal it outputs to be indeterminant, and the polarization seems to vary randomly with time. As a result, any polarization-sensitive switching device receiving a signal from such an optical fiber will display a switching characteristic that uncontrollably varies with time. In U.S. Pat. No. 5,002,349, Cheung et al. have proposed a polarization-insensitive acousto-optical switching element. Although this device offers promise, at the present time its fabrication is difficult and expensive, and its eventual usefulness remains uncertain.

Patel has proposed a number of frequency-selective, liquid-crystal devices. In particular, in U.S. Pat. No. 5,111,321 incorporated herein by reference, he has described a drop-add circuit which can selectively switch one frequency component out of an optical channel. Further, in that patent, he has described a polarization-insensitive optical filter in which the input signal has its two polarization states spatially divided by a calcite crystal.

Soref has proposed a liquid-crystal optical switch in "Low-cross talk 2×2 optical switch," *Optics Letters*, vol. 6, 1981, pp. 275–277. His switch depends on both a liquid-crystal device and polarization-splitting prisms. His prisms are considered to be impractical because they require liquid-crystal devices of uniform characteristics over a large area. Soref et al. have proposed another liquid-crystal switch in "Calcite 2×2 optical bypass switch controlled by liquid-crystal cells," *Optics Letters*, vol. 7, 1982, pp. 186–188. This device substitutes calcite crystals for the earlier prisms. Three calcite crystals sandwich two liquid-crystal modulators. Half-wave plates are inserted into one of the polarization-differentiated beams so the unpatterned twisted nematic liquid-crystal modulators act similarly on the two beams. Soref et al. disclose that the separation of the two beams, partially dictated by the half-wave plates, to be 2.7 mm, which is still too large for a rigorously uniform liquid-crystal device. Fujii has proposed a compact version of the Soref system in "Low-Crosstalk 1×2 Optical Switch Composed of Twisted Nematic Liquid Crystal Cells," *IEEE Photonics Technology Letters*, vol. 5, 1993, pp. 206–208. His system includes two assemblies on each end including a bulk polarization beam splitter and a segmented liquid-crystal modulator. A birefringent crystal is placed between the two assemblies. Wagner et al. in "Electrically controlled optical switch for multimode fiber applications," *Applied Optics*, vol. 19, 1980, pp. 2921–2925 have proposed a polarization-diversity switch using polarization beam splitters and twisted nematic liquid crystals.

None of these prior-art liquid-crystal switches offers a practical rugged optical switch. The desired optical switch has minimum separation between the various beams so that any spatial non-uniformities of the liquid-crystal device in the lateral directions minimally affect its characteristics. The device should be compact. Preferably, it should consist of planar layers so that its layers can be easily bonded into an integral whole. The basic configuration should be easily expandable to a larger switch with little increase in complexity.

SUMMARY OF THE INVENTION

The invention can be summarized as a liquid-crystal beam switch in which an input birefringent layer spatially splits an input beam according to its two polarizations, and a segmented liquid-crystal polarization modulator converts the beams to the same polarization state. An electrical switch controlling the liquid-crystal modulator determines the polarization state. An intermediate birefringent layer having an optical axis offset from that of the input birefringent layer displaces both beams by a lateral extent dependent upon their polarization direction, which is determined by the biasing source. An output birefringent layer and associated segmented liquid-crystal modulator operate inversely to the input birefringent layer to recombine the beams into one of multiple possible output beams. Further stages of birefringent layers and liquid-crystal polarization modulators may be included between the input and output birefringent layer to allow a greater degree of switching.

DETAILED DESCRIPTION OF THE PREFERRED EMBODIMENTS

Figure 1:
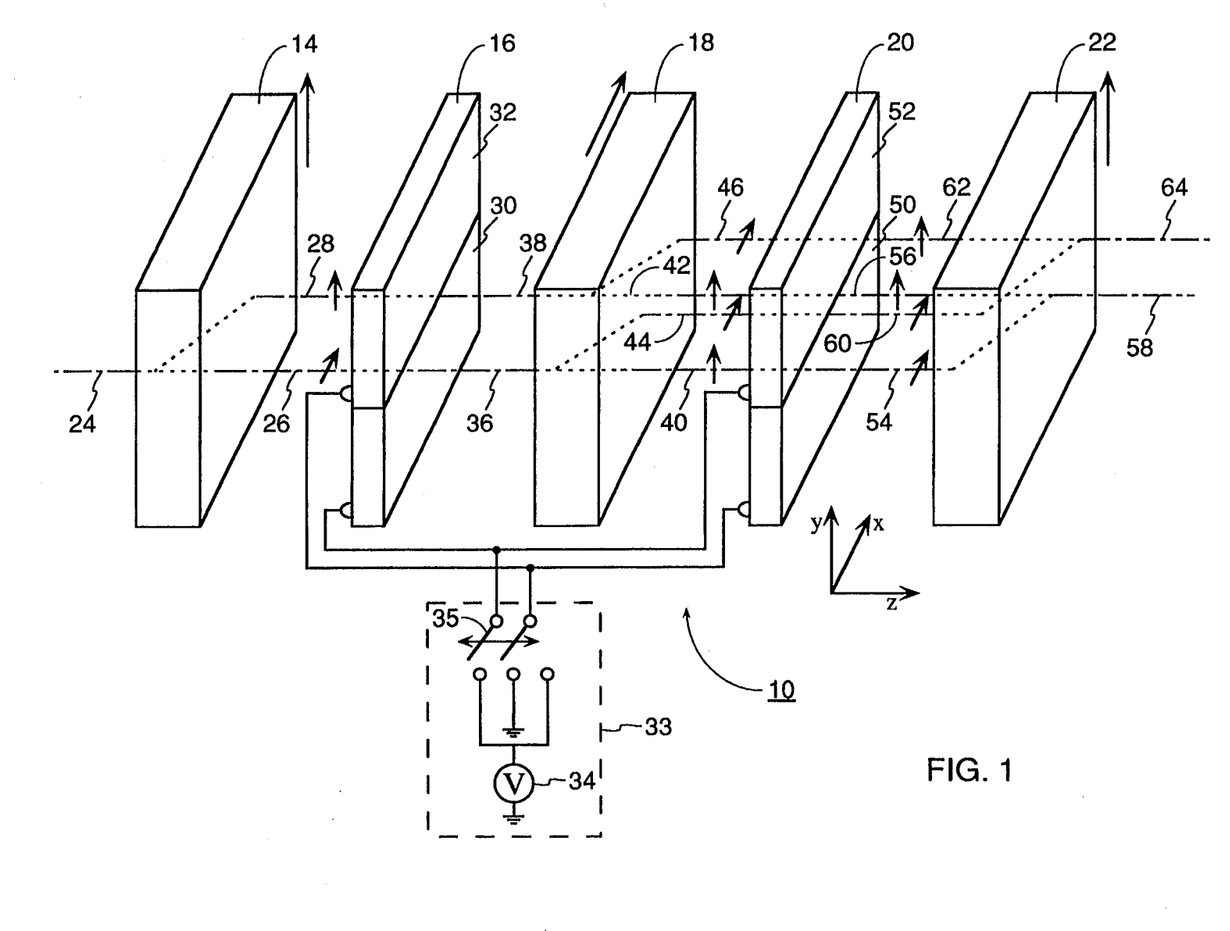
FIG. 1 is an exploded isometric view of a 1×2 optical switch of the invention.

A first embodiment of the invention, a 1×2 optical switch 10, is illustrated isometrically in FIG. 1, in which the various elements are separated in the exploded view in order to more clearly illustrate the optical beams. The planar elements are in fact closely juxtaposed and joined together in a rugged practical device. The 1×2 switch 10 includes an entrance singly crystalline birefringent planar layer 14, a calcite crystal for example, a first segmented liquid-crystal polarization modulator 16, an intermediate crystalline birefringent planar layer 18, a second segmented liquid-crystal polarization modulator 20, and an exit singly crystalline birefringent planar layer 22. The entrance birefringent crystal 14 has its optical axis tilted at an oblique angle within the y-z plane. Light electrically polarized along the x-axis passes through the birefringent crystal 14 undeflected, but light polarized in the y-direction is laterally deflected. As a result, unpolarized light propagating in a beam 24 along the positive z-direction has its linearly polarized components divided into an x-axis polarized beam 26 and a y-axis polarized beam 28. The y-axis polarized beam 28 is positioned above the x-axis polarized beam 26 in the y-direction.

The differently polarized beams 26 and 28 pass through different vertically arranged segments 30 and 32 of the first liquid-crystal polarization modulator 16. Each liquid-crystal segment 30 and 32 can either, dependent on a bias voltage 34 applied across it by a voltage source 33 as switched by a double-pole, double-throw switch 35, pass the beam with its polarization unchanged or rotate its linear polarization by 90° or an odd multiple thereof. Typically, the bias voltage 34 provides a square-wave signal in the 10-kHz range. Other structures for the voltage source 33 are more amenable to electronic integration.

These liquid-crystal segments 30 and 32 are conventional twisted nematic liquid-crystal cells but without the usual polarizers. Transparent electrodes are applied to the opposing sides of the segments 30 and 32. In the figure, the grounding of the right sides of the liquid-crystal modulators 16 and 20 is not illustrated. The segmentation is achieved by electrically isolating two electrode portions on one side while the electrode on the other side may be continuous and uniformly biased.

A nematic liquid crystal is filled into the gap of the cell. Alignment layers disposed on either side of the gap are buffed in perpendicular directions so that the nematic liquid crystals undergo a 90° rotation between the two alignment layers. The twist is slow enough, in the unbiased state, that light polarized either parallel or perpendicularly to the alignment direction of the initial alignment layer follows the slowly twisting liquid crystal. Since, in most common nematic liquid crystals, both polarizations are equally waveguided, incident light of any polarization is rotated with relative polarization maintained. The thickness of the liquid-crystal cell is typically large enough that the light's linear polarization is rotated by 90°. On the other hand, if the liquid crystals are strongly electrically biased, they will align along the direction of the applied electric field. As a result, in its actively biased state, the liquid-crystal cell no longer rotates the light, and the light passes through the cell with no rotation of its polarization. A twisted smectic structure can also rotate polarization, as Patel disclosed in U.S. Pat. No. 5,172,257.

The differential segmented biasing actively biases only one of the segments 30 or 32, whereby it does not rotate the light polarization, but does not actively bias the other segment 32 or 30, whereby it rotates the light polarization by the twisted nematic structure. Thus, two beams 36 and 38 exiting the first segmented liquid-crystal polarization modulator 16 have the same polarization direction, and the polarization direction is determined by which segment 30 or 32 the switching bias source 33 turns on.

Both beams 36 and 38 then pass through the intermediate calcite crystal 18, which has its optical axis aligned in the x-z plane so that the beams 36 and 38 are dispersed along the x-axis according to polarization. However, the biasing of the first liquid-crystal polarization modulator 16 has polarized the beams 36 and 38 into the same one of two linear polarizations such that the intermediate calcite crystal 18 either laterally shifts both beams 36 and 38 by the same amount or does not shift them. If the upper liquid-crystal segment 32 is actively biased and the lower segment 30 is unbiased so that both beams 36 and 38 are polarized along the y-direction, then the intermediate calcite crystal 18 does not displace them, and they pass into y-polarized beams 40 and 42. However, if the upper liquid-crystal segment 32 is unbiased and the lower segment 30 is actively biased so that both beams 36 and 38 are polarized along the x-axis, the intermediate calcite crystal 18 displaces both of them and they become x-polarized beams 44 and 46. The illustration notwithstanding, the described mode of biasing allows only two of these beams to exist at any one time; either the y-polarized beams 40 and 42, or the x-polarized beams 44 and 46. However if desired, it is possible to simultaneously partially bias all of the segmented liquid-crystal cells 16, 20, and 92 so that all four beams 42–46 emerge from the last calcite crystal 22. Such simultaneous partial biasing applies to the other embodiments as well.

The four beams 40 through 46 then pass through a second segmented liquid-crystal modulator 20, which replicates the structure of the first such modulator 16 and thus has a lower segment 50 and an upper segment 52. However, its electrical connections are reversed such that, when the lower segment 50 of the second modulator 20 is actively biased, the lower segment 30 of the first modulator 16 is not actively biased, and vice versa. The upper segments 32 and 52 are similarly differentially biased. In the situation that the first liquid-crystal modulator 16 has its upper segment 32 actively biased and its lower segment 30 inactive, the intermediate calcite crystal 18 passes the beams 36 and 38 without deflection into y-polarized beams 40 and 42. When these beams 40 and 42 pass through the oppositely biased segments 50 and 52 of the second liquid-crystal modulator 20, the lower segment 50 rotates the y-polarized beam 40 into an x-polarized beam 54, but the upper segment 52 leaves the y-polarized beam 40 as y-polarized beam 56. These differently polarized beams 54 and 56 are then recombined into a first output beam 58 by the exit calcite crystal 22 having its optical axis parallel to that of the entrance calcite crystal 14. On the other hand, when the first liquid-crystal modulator 16 has its upper segment 32 inactive and its lower segment 30 actively biased, the intermediate calcite crystal 18 deflects the x-polarized beams 36 and 38 into x-polarized beams 44 and 46. When these beams 44 and 46 pass through the oppositely biased segments 50 and 52 of the second liquid-crystal modulator 20, the lower segment 50 leaves the x-polarized beam 44 as x-polarized beam 60, but the upper segment rotates the x-polarized beam 46 into a y-polarized beam 62. These yet differently polarized beams 60 and 62 are recombined into a second output beam 64 by the exit calcite crystal 22. The exit calcite crystal 22 needs to have the same thickness or, in the case of a general birefringent layer, the same birefringent length as that of the first calcite crystal 14. Although the two birefringent optical axes are illustrated as being parallel, the same effective result is obtained when they are anti-parallel, and henceforward the term parallel will be understood to include anti-parallel.

As should be obvious from the above description, dependent on how the switching bias source 33 differentially biases the two liquid-crystal polarization modulators 16 and 20, the input beam 24 is switched either into the output beam 58 or the output beam 64. It would, of course, be possible to achieve only partial switching if the two liquid-crystal modulators 16 and 20 were biased or buffed so as to achieve other than 90° differential rotation. This optical switching is achieved by the simple change of cell biasing effected by the double-pole, double-throw switch 35, which may be replaced by many other equivalent switching techniques more amenable to electronic integration.

Figure 2:
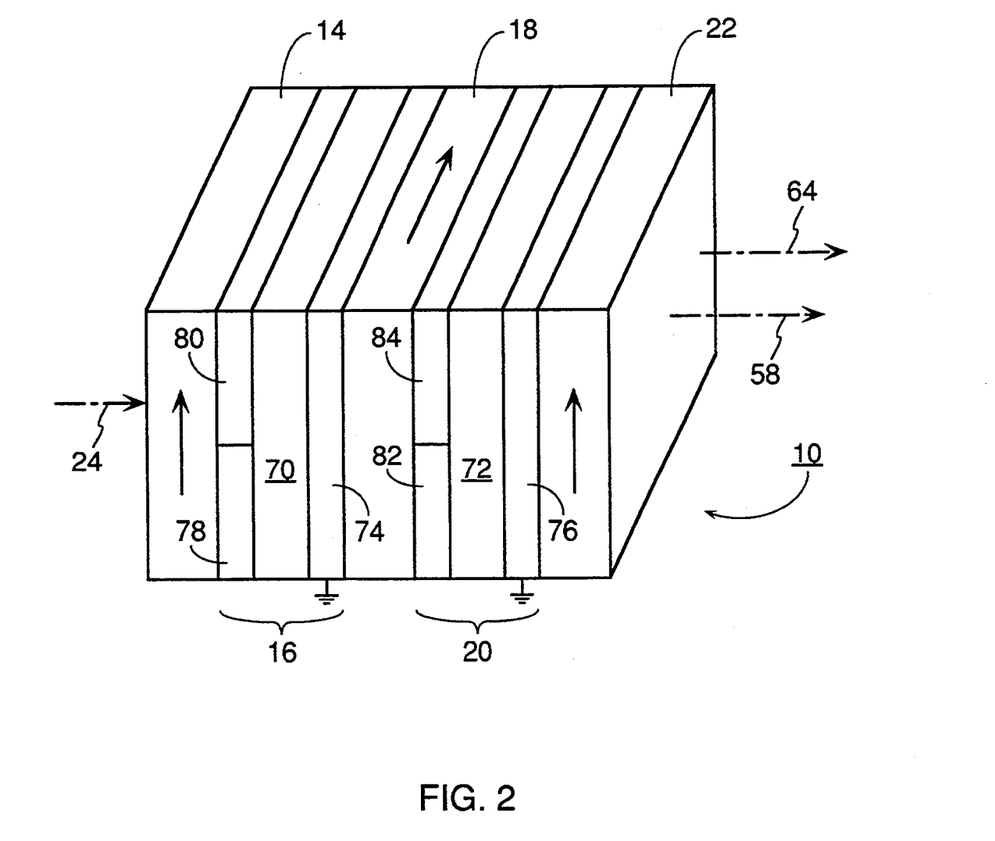
FIG. 2 is an isometric view of the optical switch of FIG. 1 in an integrated form.

The combination of liquid-crystal cells and birefringent layers has the significant advantage of allowing the assembly of the elements into a rugged, integrated unit illustrated isometrically in FIG. 2. The segmented liquid-crystal polarization modulators 16 and 20 comprise respective unsegmented liquid-crystal filled gaps 70 and 72 sandwiched between grounded unsegmented electrodes 74 and 76 and electrode segments 78–84. The perpendicularly buffed alignment layers between the gaps 70 and 72 and the electrodes 78 through 84 are not illustrated. In this embodiment, it is possible to totally eliminate the glass substrates onto which the alignment layer and electrodes are usually deposited by depositing both of them onto the calcite crystal and to confine the liquid crystal between two so deposited calcite crystals.

The configuration shown in FIG. 2 can be modified but still yield the same result if the segmented one of the two electrodes of one of the two liquid-crystal cells 16 and 22 is arranged on the other side of its liquid-crystal cell 70 or 72 and the biasing leads are correspondingly changed.

EXAMPLE

The invention was demonstrated with a 1×2 switch. All the calcite crystals were 4-mm thick, providing beam displacements of 400 μm in the respective directions. Two liquid-crystal cells were fabricated as rigid units by techniques similar to those described by Patel in U.S. Pat. No. 5,150,236. The integrated unit of FIG. 2 was assembled by attaching two properly registered liquid-crystal elements to the middle calcite crystal using UV curable epoxy. The outer calcite crystals with the proper orientations were attached by epoxy to the intermediate structure. Single-mode optical fibers having collimating graded-index lenses were used as optical input and output ports. These lenses produced 250-μm diameter beams in the liquid-crystal assembly and refocused them in the output fibers. The light source was a distributed-feedback solid-state laser operating at 1.5457 μm.

The experiments showed that, dependent on the biasing state of the liquid-crystal polarization modulators, the switch of the invention produced an extinction ratio of −37 dB. If alignment is kept within a reasonable 5°, a crosstalk of −40 dB should be achievable. Scattering is expected to more effectively limit crosstalk performance. The switching times were of the order of tens of milliseconds. The switch-on and switch-off times were different since the switch-on time is determined by the magnitude of the square of the applied voltage while the switch-off time is determined by the reciprocal of the square of the cell thickness. The switching speeds can be made symmetric and faster and the switching state made non-volatile if a ferroelectric liquid-crystal structure is used as disclosed by Clark and Lagerwall in U.S. Pat. No. 4,364,924. One type of ferroelectric liquid-crystal cell has been disclosed by Patel in U.S. Pat. No. 5,172,257.

The design of the planar structure illustrated in FIG. 2 can be extended to a multi-stage, $1 \times 2^N$ optical switch, where N is an integer greater than one. Similarly to the integrated 1×2 switch 10 of FIG. 2, an integrated 1×4 switch 80 illustrated isometrically in FIG. 3, includes the entrance calcite crystal 14, the first segmented liquid-crystal polarization modulator 16, and the first intermediate calcite crystal 18. At this point, as is clear from reexamining FIG. 1, there exist two y-polarized light beams 40 and 42 or two x-polarized light beams 44 and 46, one propagating in the upper-y half-space and the other in the lower-y half-space. The polarization direction of the two beams 40 and 42 or 44 and 46 depends on the biasing state of the first segmented liquid-crystal modulator 16.

Returning to FIG. 3, these beams then pass through an unsegmented intermediate liquid-crystal polarization modulator 92, which includes a gap 94 filled with a nematic liquid crystal and sandwiched between unsegmented electrodes 96 and 98 and associated perpendicularly buffed alignment layers. The unsegmented electrode 96 is biased by a second switched biasing source 100 having a single-throw, double-pole switch 102 alternatively connected to the biasing voltage source 34 and ground. If the switch 102 is thrown to ground, the intermediate liquid-crystal modulator waveguides the light and thus rotates it by 90°. On the other hand, when the voltage source 100 actively biases the intermediate liquid-crystal modulator 92, it passes the light with its polarization unchanged. As a result, the polarization of the light exiting the intermediate liquid-crystal modulator 92 depends on the biasing states of both the bias sources 33 and 100. An intermediate calcite crystal 104 is positioned after the intermediate liquid-crystal modulator 92. It has approximately twice the thickness of the first calcite crystal 18, and its optical axis is aligned within the plane of the segmentation boundaries of the two segmented liquid-crystal modulators 16 and 20. Dependent upon the polarization of the light beams passing through it, the intermediate calcite crystal 104 either deflects the beams along the x-axis or passes the beams without deflecting them. This selective lateral deflection provides the additional factor of two in the switching. The larger size of the intermediate calcite crystal 104 guarantees that none of the four beams overlap. Any size differential can achieve the same result assuming beam widths and other practicalities are considered.

Figure 3:
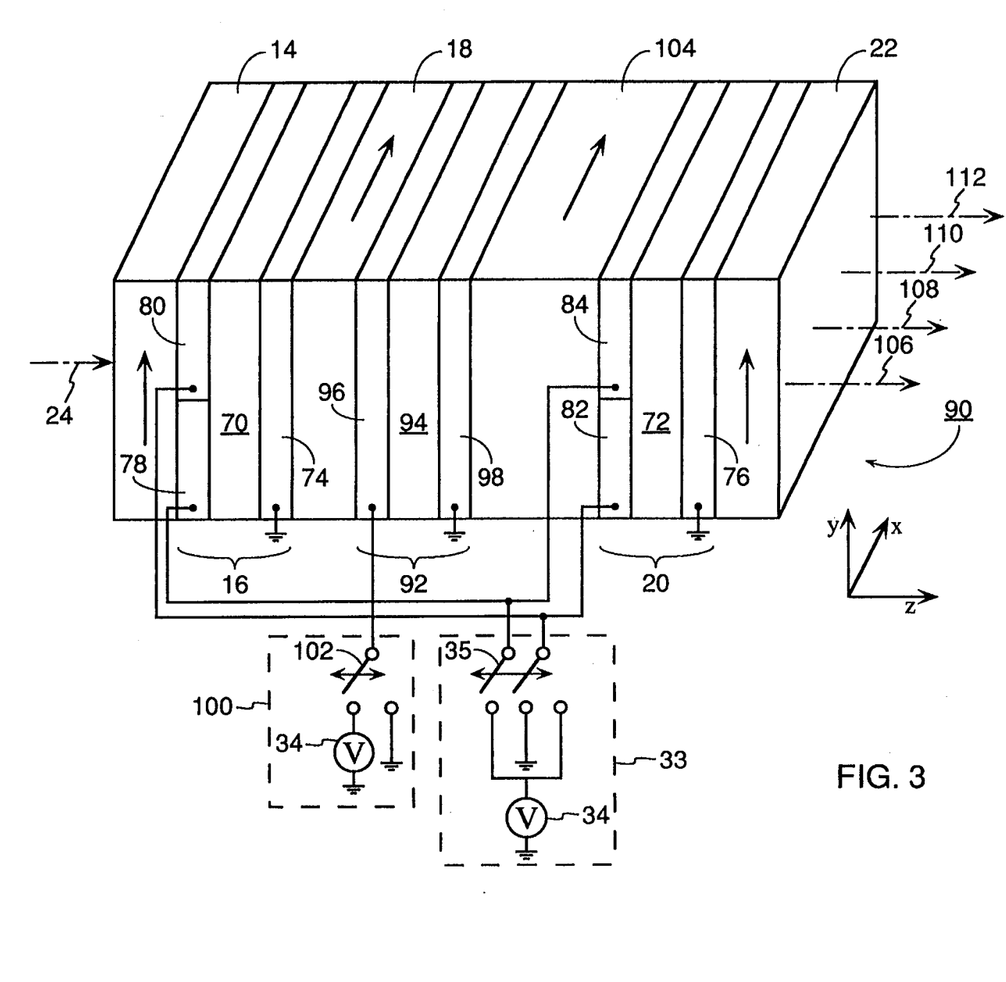
FIG. 3 is an isometric view of a 1×4 optical switch.

The pair of beams, one at +y and the other at −y and occupying one of four positions in the x-direction, then pass through the second segmented liquid-crystal modulator 20, which rotates the polarization of one of the beams in compensation of the polarization rotation imposed on it by the first segment liquid-crystal modulator 16. The exit calcite crystal 22 then recombines the two perpendicularly polarized beams into one of four beams 106, 108, 110, and 112 having parallel paths arranged along the x-axis. Thus, dependent upon the biasing states of the two switching bias sources 33 and 100, the input beam 24 is switched to one of four output beams 106 through 112.

Table 1 summarizes the relationships between the biasing states and which output beam 106 through 112 the input beam 24 is switched to. In the table, ON means that the liquid-crystal is actively biased so that it passes the beam without rotation of the polarization while OFF means it is inactive and rotates the beam's polarization.

TABLE 1

| Entrance Liquid Crystal | | Middle Liquid Crystal | Exit Liquid Crystal | | Output Beam | | | |
|---|---|---|---|---|---|---|---|---|
| +y | −y | | +y | −y | 106 | 108 | 110 | 112 |
| ON | OFF | ON | OFF | ON | x | — | — | — |
| OFF | ON | OFF | ON | OFF | — | — | — | x |
| ON | OFF | OFF | OFF | ON | — | — | x | — |
| OFF | ON | ON | ON | OFF | — | x | — | — |

The concept of FIG. 3 can be extended to any $1 \times 2^N$ switch, where N is a positive integer greater than the N=2 of FIG. 3, by including additional intermediate calcite crystals having optical axes with components along the x-direction and of thicknesses to preclude overlap of beam paths and by further including unsegmented liquid-crystal modulators biased by separately switched bias sources. If the additional intermediate calcite crystal instead has its optical axis with a component aligned along the y-direction, it produces a rectangular array rather than a linear array of output beams.

Ferroelectric liquid crystals exhibit several advantages when used with the invention. If the ferroelectric crystal is filled into the liquid-crystal gaps 70 and 72 of FIG. 3, the device becomes bistable. That is, a pulse of voltage can set up the transmission path, and, after the pulse is removed, the transmission path remains intact. Also, the switching speed is generally faster.

Figure 4:
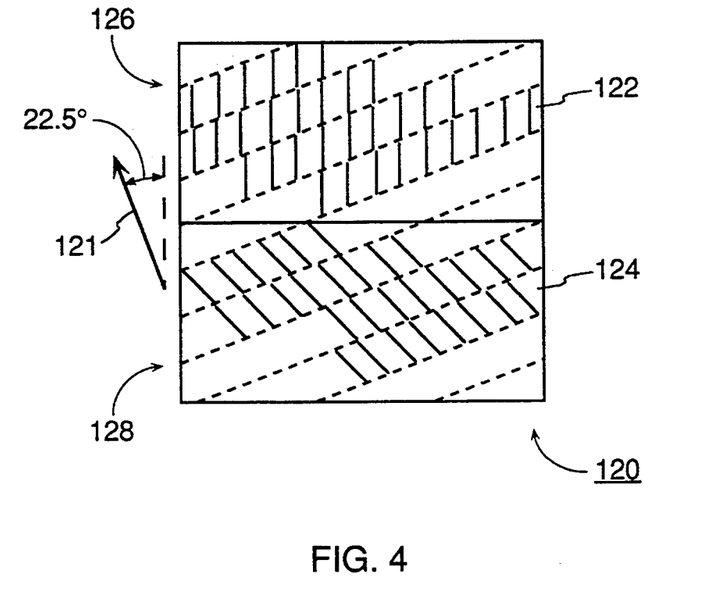
FIGS. 4 and 5 are planar views of the liquid-crystal orientations under two biasing conditions in a ferroelectric liquid-crystal cell in an alternative embodiment of the invention.

Consider first the case of segmented electrodes and unsegmented alignment layers. FIG. 4 illustrates in plan view a schematic representation of a ferroelectric liquid-crystal layer 120 biased in a first polarity combination. In this embodiment, the alignment layers on both sides of the liquid-crystal gap are buffed in a direction 121 at an angle $22\frac{1}{2}°$ to the upper left of the y-axis. As Clark and Lagerwall explain in the previously cited patent, the molecules of one type of ferroelectric liquid crystal align along the surface of a cone with a half angle of $22\frac{1}{2}°$ with respect to the buffing direction 121 and form into smectic layers 122 and 124 extending perpendicularly across the liquid-crystal gap and perpendicularly to the buffing direction 121. For thin films, the alignment layers pin these cones in the horizontal plane, as has been explained by Clark and Lagarwall. For example, if the ferroelectric liquid-crystal material is first raised to a sufficiently high temperature that the ferroelectric liquid crystals are in an isotropic state, when the temperature is lowered to a first temperature, all the liquid crystals align along the buffing direction, in what is called a smectic-A phase. Thereafter, when the temperature is again lowered to a second temperature, the cone opens and the ferroelectric liquid crystals, in what is called the smectic-C phase, can assume positions around the cone. But, in this phase, next to the alignment layer they are horizontally aligned at $\pm 22\frac{1}{2}°$ with respect to the buffing axis, that is, at the illustrated 0° and 45°.

When a voltage is applied across the liquid-crystal gap, its ferroelectric character causes the liquid-crystal molecules within the bulk of the gap to align with one of the two degenerate directions of the cones depending upon which of the pair of electrodes is properly biased. In this embodiment of the invention, the positive bias on an upper half 126 causes its liquid crystals in the bulk to become aligned with that of the alignment layer next to the positive electrode, that is, in the vertical direction as indicated by the short lines. On the other hand, the segmented electrodes apply the complementary, negative bias to a lower half 128 so that its liquid crystals in the bulk become aligned with the 45° buffed alignment layer on the other side of the liquid-crystal gap, that is, at the 45° direction as indicated by the corresponding short lines. In bistable operation, the removal of the biasing voltage leaves the liquid crystal in its previously biased state, that is, the liquid-crystal molecules are latched to continue their previous optical effect.

When light strikes a ferroelectric liquid-crystal material and its electrical light polarization is either parallel or perpendicular to the bulk alignment of the liquid crystal, such as occurs with the upper half 126 with the first biasing combination, the light incurs a phase delay that depends upon the perpendicularity, but the polarization direction is maintained intact. On the other hand, when the light strikes a ferroelectric liquid crystal and its polarization is offset by 45° with respect to the liquid-crystal alignment direction which is offset $22\frac{1}{2}°$ from the buffing direction 121, its two polarization components parallel to and perpendicular to the liquid-crystal axis experience different refractive indices and are differentially retarded by the liquid crystal. That is, when the light polarization is offset 45° from the liquid-crystal alignment, the liquid crystal manifests its birefringent nature, and the two light components experience a different phase length. The thickness of the ferroelectric liquid crystal is chosen such that the difference of the phase lengths is $\pi$ or an odd multiple thereof. With this phase delay, the lower half 128 of the liquid-crystal layer 120 rotates the linear polarization of the light traversing it by 90°. On the other hand, as illustrated in the plan view of FIG. 5, when the complementary biases are applied to the segmented electrodes, the relative rotation is also complementary. The polarization of the light traversing the upper half 126 is rotated by 90°, but that traversing the lower half 128 passes unrotated.

Figure 5:
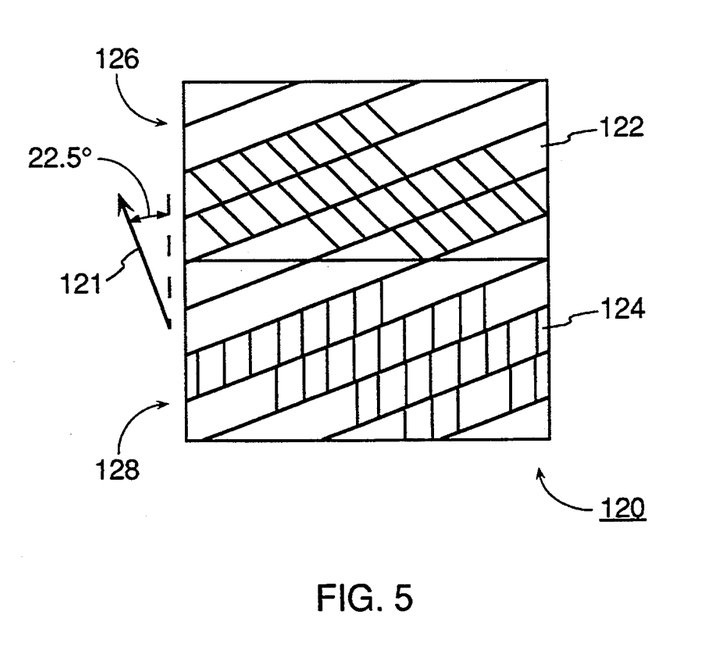

Thus, the ferroelectric cell of FIGS. 4 and 5 functions similarly to the twisted nematic cell of FIGS. 1 and 2. Furthermore, however, the ferroelectric switch is bistable so that the biasing voltage does not need to be maintained during the continued switching, and the ferroelectric cell enjoys generally faster switching.

This differential biasing of the two halves 126 and 128 can be accomplished either by two paired segmented electrodes operating with $\pm V/2$ or by one segmented electrode operating with $\pm V$ and another, grounded unsegmented electrode.

Figure 6:
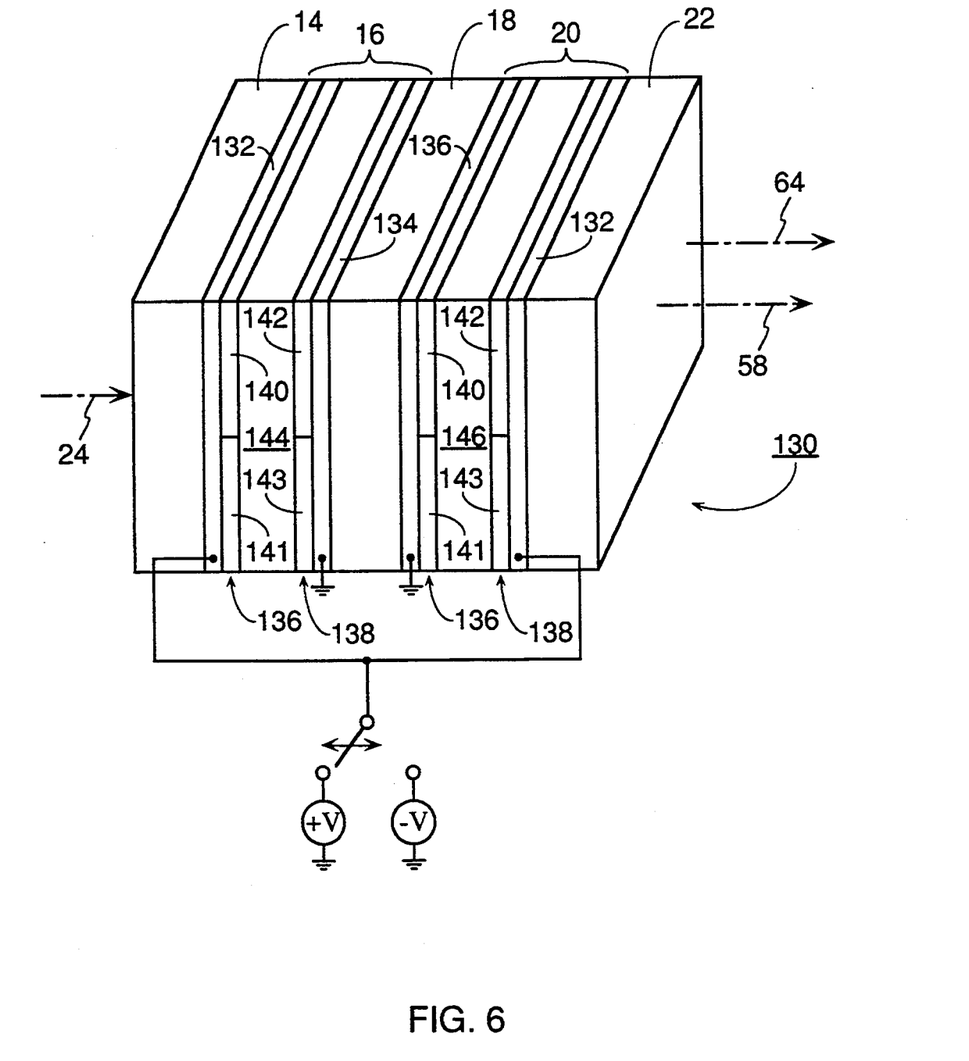
FIG. 6 is an isometric view of a 1×2 ferroelectric optical switch of the invention.
Figure 7:
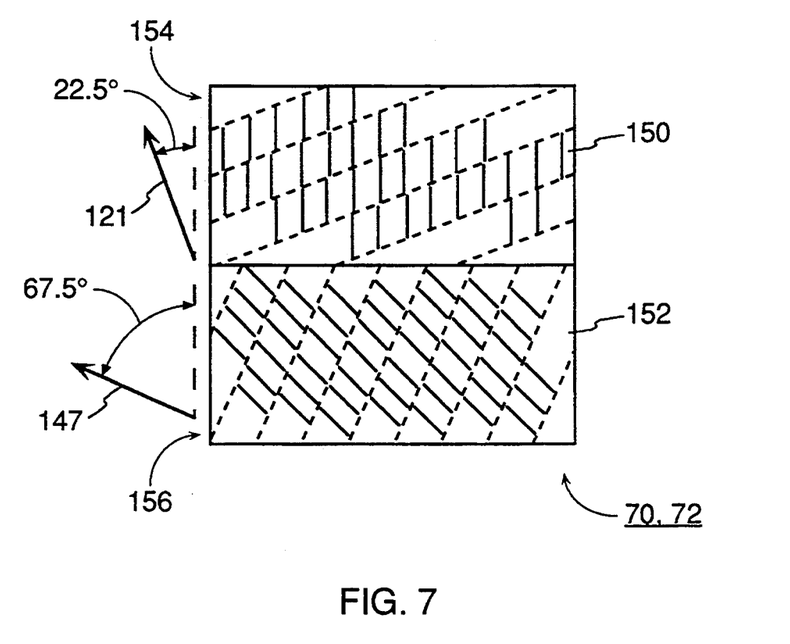
FIGS. 7 and 8 are planar views of the liquid-crystal orientations under two biasing conditions for the ferroelectric optical switch of FIG. 5.
Figure 8:
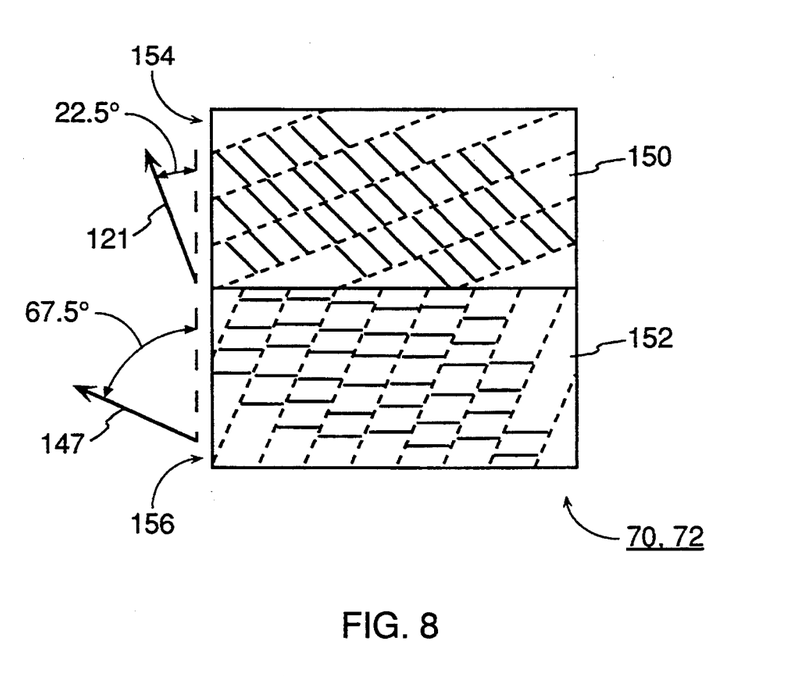

A ferroelectric liquid crystal further allows the alignment layers rather than the electrodes to be segmented. A ferroelectric switch 130 illustrated isometrically in FIG. 6, has two liquid-crystal polarization modulators 16 and 20, each of which includes two unsegmented electrodes 132 and 134 and two segmented alignment layers 136 and 138, each divided into respective pairs of alignment halves 140, 141 and 142, 143. Two liquid-crystal gaps 144 and 146 are filled with a ferroelectric liquid crystal, preferably having a half-cone angle of 22½°. The two alignment segments 140 and 141 on one side of the liquid-crystal gap 144 or 146 are buffed in directions 121 and 147 at relative angles of 45° as illustrated in FIG. 7. The alignment halves 142 and 143 on the other side of the liquid-crystal gap 144 or 146 are buffed at the same angles as the corresponding alignment halves 142 and 143 on the first side. As illustrated in FIGS. 7 and 8, the differential buffing causes smectic layers 150 and 152 in the two halves 154 and 156 of the liquid crystal 144 or 146 illustrated in FIG. 6 to also extend at 45° to each other, and similarly for the relative liquid-crystal alignment directions. More importantly, when the cell 16 or 20 is positively biased as illustrated in FIG. 7, the liquid-crystals in the upper half 154 are arranged vertically while those in the lower half 152 are arranged at 45°. As a result, light polarized either vertically or horizontally that is traversing the upper half 154 does not undergo polarization rotation, but such light traversing the lower half 156 is rotated by 90°. On the other hand, when the cell 16 or 20 is negatively biased as illustrated in FIG. 8, the liquid-crystal orientations shift 45° to the left. As a result, light polarized either vertically or horizontally that is traversing the upper half 154 is rotated 90°, but such light traversing the lower half 156 is not rotated.

This embodiment has the advantage that fewer electrical leads are required, and the electrode segments do not need to be isolated. In a variant of this embodiment, the number of voltage sources can be reduced to one if both electrodes 136 are switched between the one voltage source and ground.

Calcite is the most common example of crystalline birefringent materials, but other birefringent materials may be used. Although the birefringent deflection of beams has been expressed in terms of the thickness of the birefringent layers, the proper measure is birefringent length, that is, the differential deflection of the two beams per unit length times the length, which may be an actively switched quantity.

The above embodiments have included entrance and exit birefringent layers having a parallel component of their optical axes. Equivalent results are obtained when they have anti-parallel components. A strict alignment of the optical axes of the calcite crystals with the Cartesian coordinates is not required as long as the beams traverse the correct segment of the segmented liquid-crystal modulators.

The embodiments described above are all reciprocal devices, that is, they can be operated in the reverse direction. As a result, the invention includes a $2^N \times 1$ switch, that is, a spatial multiplexer as well as a spatial demultiplexer. Both of these devices will be referred to as an $1 \times 2^N$ switch. Furthermore, the input beam of FIGS. 1-3 can be replicated M times along the x-axis to provide a parallel $M \times M \cdot 2^N$. By careful spacing of the input beams relative to the birefringent thicknesses, the liquid-crystal switch of the invention can be configured for more specialized uses, for example, where multiple parallel channels are switched a selected number of channels to one side or the other.

The invention provides several advantages over the prior art, even the prior-art liquid-crystal switches. Its planar structure is rugged if bonded together, and the uniform thicknesses of all layers facilitates such bonding. The miniaturization of the liquid-crystal switches in the lateral directions is limited primarily by the segmentation boundary of the liquid-crystal electrodes or alignment layers and by the minimum lateral spacing of the output beams required to couple the switched beam to separate optical channels, such as optical fiber.

What is claimed is:

1. A ferroelectric liquid-crystal optical switch comprising in succession in the direction of an input optical beam a first crystalline birefringent polarization light separator separating light according to its polarization along a first axis offset from the propagation direction of the input optical beam, a first polarization light modulator comprising a ferroelectric liquid-crystal and having an alignment layer comprising two alignment portions having alignment directions offset by 45° with respect to each other, said alignment portions defining two segments displaced along said first axis to rotate one of the polarization rotations of the beams passing therethrough dependent on the states of the first ferroelectric liquid crystal segments to cause both beams to have the same polarization state, a second crystalline birefringent polarization light separator separating light according to its polarization along a second axis offset from said first axis and said propagation direction, a second polarization light modulator comprising a second ferroelectric liquid-crystal and having an alignment layer comprising two alignment portions having alignment directions offset by 45° with respect to each other, said alignment portions defining two segments displaced along said first axis to rotate one of the polarization rotations of the beams passing therethrough dependent on the state of the second ferroelectric liquid crystal segments to cause the two beams to have orthogonal polarization states, and an exit crystalline birefringent layer having an optical axis parallel with said first direction for recombining the separated light, and further comprising biasing means applied to said alignment portions of said first and second liquid-crystal light modulators for selectively setting the states of said first and second ferroelectric liquid crystals.

2. A ferroelectric liquid-crystal optical switch in accordance with claim 1 wherein said first and second light modulators each includes a segmented electrode.

3. A ferroelectric liquid-crystal optical switch in accordance with claim 1 wherein said alignment layers of said first and second light modulators are each segmented and said first and second light modulators each includes two unsegmented electrodes.

4. A ferroelectric liquid-crystal optical switch in accordance with claim 1 wherein the two light components passing through each of said first and second light modulators experience a different phase length and the thickness of each of said first and second light modulators is such that the difference of the phase lengths is $\pi$ or an odd-multiple thereof.

* * * * *